United States Patent [19]

Marie

[11] Patent Number: 4,496,518

[45] Date of Patent: Jan. 29, 1985

[54] $TM_O$ AND $TE_O$ CAVITY RESONATOR FOR PROJECTING PLASMA CONFINING $TE_O$ MODE COMPONENTS

[76] Inventor: Georges R. P. Marie, 17, Ave. Raymond Croland, Fontenay-aux-Roses, France, 92260

[21] Appl. No.: 300,151

[22] Filed: Sep. 8, 1981

Related U.S. Application Data

[63] Continuation-in-part of Ser. No. 125,089, Feb. 27, 1980, abandoned.

[51] Int. Cl.$^3$ .......................... G21B 1/00; H01S 3/082
[52] U.S. Cl. .......................... 376/104; 372/19; 372/27; 372/33; 372/106
[58] Field of Search .................. 372/19, 27, 76, 101, 372/106, 33; 376/104; 350/157

[56] References Cited

U.S. PATENT DOCUMENTS

| | | | |
|---|---|---|---|
| 2,464,269 | 3/1949 | Smith | 350/157 |
| 3,283,262 | 11/1966 | Marcatili | 350/157 |
| 3,541,471 | 11/1970 | Kaminow et al. | 372/106 |
| 3,777,280 | 12/1973 | Pohl | 372/19 |
| 3,936,770 | 2/1976 | Reintjes, Jr. et al. | 350/157 |
| 4,175,830 | 11/1979 | Marie | 350/157 |
| 4,219,254 | 8/1980 | Macken | 372/33 |
| 4,235,517 | 11/1980 | Marie | 350/157 |
| 4,305,046 | 12/1981 | Le Floch et al. | 372/27 |

OTHER PUBLICATIONS

L. H. Adams et al.: Superimposed Birefractory Plates, Journal of Research of the National Bureau of Standards–vol. 69C, No. 2, pp, 103–114.

Yasuto Mushiake et al.: Generation of Radially Polarized Optical Beam Mode by Laser Oscillation, Proc IEEE, vol. 9, 9/72, pp. 1107–1109.

*Primary Examiner*—Sal Cangialosi
*Attorney, Agent, or Firm*—Lowe, King, Price & Becker

[57] ABSTRACT

A generator of a $TE_O$ mode wave beam, particularly adapted for confining plasmas, comprises a laser device for generating an electromagnetic wave having at least a $TM_O$ mode component. The $TM_O$ mode component is filtered by parallel sided plates or refractive surfaces disposed at the Brewster angle for the $TM_O$ component to derive an intermediate wave beam. A $TM_O$-$TE_O$ mode converter shifts the $TM_O$ mode intermediate wave polarization vector by an angle of $\pi/2$ radians.

5 Claims, 8 Drawing Figures

4,496,518

TM$_O$ AND TE$_O$ CAVITY RESONATOR FOR PROJECTING PLASMA CONFINING TE$_O$ MODE COMPONENTS

The present application is a continuation-in-part of U.S. pat. application Ser. No. 125,089 filed Feb. 27, 1980, now abandoned.

BACKGROUND OF THE INVENTION

1. Field of the Invention

The present invention relates generally to TM$_0$ and TE$_0$ cavity resonators and more particularly to such a resonantor that substantially increases the TE$_0$ mode components, decrease the TM$_0$ mode components and projects TE$_0$ mode components on to a plasmatized material.

In the following description, the mode nomenclature includes a single subscript which indicates the number of spatial cycles along an orthoradial direction.

For electromagnetic waves from the ultrashort to optical range, the TE$_0$ propagation mode is one of the most interesting modes for applications. For telecommunication purposes in circular waveguides, the TE$_0$ mode has the least attenuation. Further, for plasma excitation, U.S. Pat. No. 4,175,830 issued Nov. 27, 1979 includes a disclosure that the TE$_0$ mode is a plasma confining mode in the presence of a D.C. magnetic field coaxial with a TE$_O$ mode wave beam; that is, when a plasma is flashed by focusing a powerful TE$_0$ mode wave beam on a solid material, a part of the plasma remains confined at the center of a focal spot where the plasma may reach a much higher temperature than anywhere else.

This property of confining electrons afforded by TE$_0$ mode waves in free space may be used to provide pseudo-cathodes in electrolytes and thus store solar energy by electrochemical reactions.

On the other hand, the TM$_0$ mode is one of the easiest to produce and filter. It is readily filtered by parallel sided plates or diopters at the Brewster's incidence angle. But the TM$_0$ mode is not endowed with a plasma confining property except when used as a standing wave in a cavity resonator.

2. Description of the Prior Art

In U.S. Pat. No. 4,175,830 issued Nov. 27, 1979 and U.S. Pat. No. 4,235,517, issued Nov. 25, 1980 are disclosed mode converters particularly for converting linearly polarized waves into positively and negatively azimuthally phase-shifted waves. However in neither of these Patents is there a disclosure of TM$_0$ to TE$_0$ wave mode converters. U.S. Pat. No. 3,283,262 issued Nov. 1, 1966 discloses optical lasers operating in the TM$_{on}$ modes by means of a so-called Brewster cone which is a dielectric conical interface having a half cone angle equal to the 90° complement of an angle having a tangent equal to the ratio of the two indicies of refraction of a media on two sides of an interface. The TM$_{on}$ mode waves pass through said interface without reflection while the other modes are partially reflected.

Yasuto Mushiake et al., in an article entitled "Generators of Radially Polarized Optical Beam Mode by Laser Oscillation" issued in Proc. IEEE, Vol. 9, September 1972, pages 1107–1109, have disclosed a laser cavity resonator having a subresonator defined by a conical glass substrate interface coated with a conical dielectric thin film. Such a laser radiates in a radially polarized mode, that is a TM$_0$ mode.

SUMMARY OF THE INVENTION

The mode converter of the invention converts a TM$_0$ wave mode derived by a plasma confining laser to the TE$_0$ mode and converts a TEM coaxial wave mode propagating through the laser medium of the TM$_0$ mode. The mode converter of the invention rotates the field polarization at any point in a wave plane through an angle of $\pi/2$. Since the electric field vectors of a TM$_0$ mode are radial, a $\pi/2$ polarization rotation of the TM$_0$ mode produces an orthoradial electric field vector which is the property of the TE$_0$ mode.

More particularly the means for rotating the electric field of an incoming wave through an angle of $\pi/2$ includes plates with parallel sides. For the considered wavelength the plates are homogeneous but anistropic. The thickness and, as applicable, anisotropic direction of the plates is such that when a polarized plane wave passes through them, the electric field of the plane wave rotates by $\pi/2$.

A material is said to be isotropic when its dielectric tensor $\overline{\overline{\epsilon}}$ which links the electric induction or flux $\overline{D}$ to the electric field $\overline{E}$ by equation $\overline{D} = \epsilon, \overline{E}$ is a spherical tensor. The material is said to be anisotropic when the electric tensor $\overline{\overline{\epsilon}}$ thereof is not a spherical tensor.

The most general dielectric tensor of a material may always be considered as being the sum of an antisymmetrical tensor and a symmetrical tensor. As a result, there are two types of anisotropic substances; (1) those with a rotatory power in which $\epsilon$ is the sum of a spherical tensor and an antisymmetrical tensor and (2) crystalline substances in which $\epsilon$ is a symmetrical but not spherical tensor.

Numerous substances of natural organic origin, such as glucose, have a "rotary power", that is the electric field of a rectilinearly polarized plane wave which propagates across this substance rotates proportionally to the propagation distance in the substance.

According to a first feature of the invention, we use for polarization rotating purposes substances with natural rotatory power; the substances are generally in liquid state or in solution. To achieve mode conversion, the substance is placed in enclosures closed by transparent flat plates with parallel faces oriented perpendicularly to the direction of propagation of the wave and separated by a distance such that the polarization rotation angle of the wave is $\pi/2$.

Substances with rotary power may have an induced rotatory power, that is have a "Faraday effect". It is known that application of an axial magnetic field to some substances arranged in enclosures, as described above, increases the natural rotatory power thereof or that a rotatory power may be induced in substances having no natural rotatory power.

In the first type of these mode converters, anisotropy is related to the antisymmetrical component of tensor $\overline{\overline{\epsilon}}$.

According to a second feature of the invention, crystals and especially halfwave plates having optical erties are used as polarization rotating means. It will be shown that if two half-wave plates are superimposed so that the fast and slow axes of one bisect the fast and slow axes of the other the resulting structure rotates the polarization plane of a rectilinearly polarized plane wave propagating through them through an angle of $\pi/2$. For optical waves including infrared waves with a wavelength as long as of the order of one micron, the half-wave plates may be cut in quartz. For centimetric waves artificial anisotropic materials form the equivalent of a half-wave plate.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENTS

Figure 1:
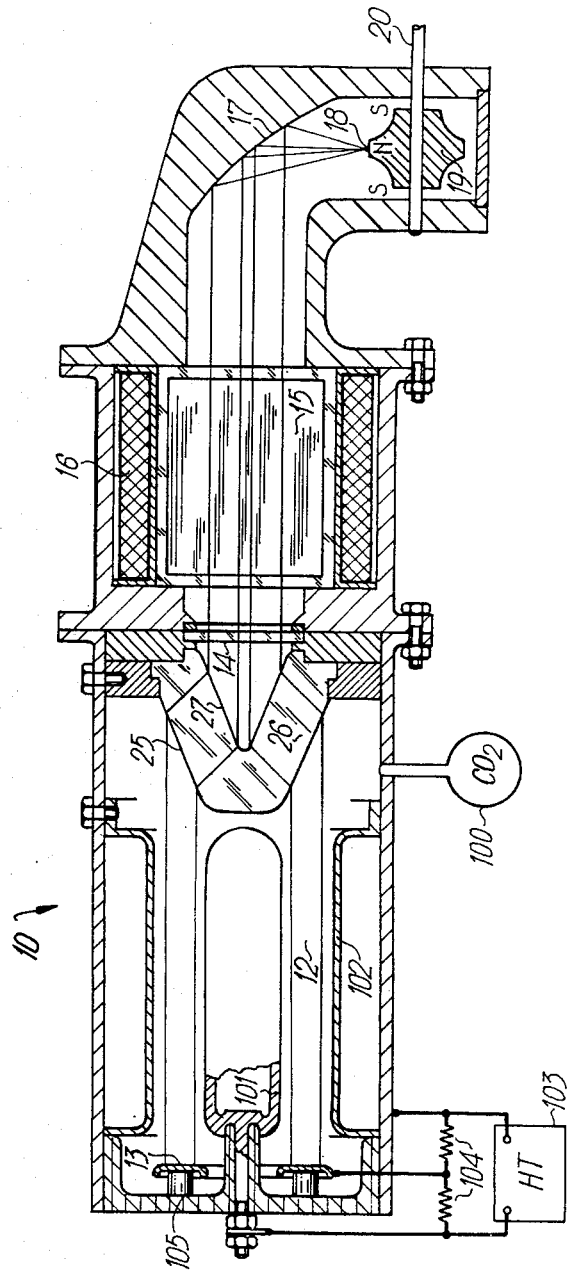
FIG. 1 is a cross sectional diagram of a carbon dioxide coaxial laser radiating in the $TM_0$ mode and comprising a mode converter which converts this $TM_0$ mode into the $TE_0$ mode.

In FIG. 1 is illustrated a carbon dioxide laser device 10 which emits a $TE_0$ mode. Laser device 10 is a carbon dioxide laser for emitting a coherent $TM_0$ wave at an optical wave length and a $TM_0$–$TE_0$ mode converter. The cavity resonator 12 of laser device 10 is a coaxial TEM cavity resonator; opposite ends of resonator 12 are bounded by a ring-shaped flat metal mirror 13 and by a semi-reflecting window 14. In the cavity resonator 12 there are two coaxial cylindrical electrodes 101 and 102 between which a high frequency pulse generator 103 applies pulses. A voltage divider 104 supplies metal mirror 13 with a voltage between the voltage of electrodes 101 and 102. Supports 105, fitted with a micrometer, not shown, accurately adjust the position of mirror 13. The carbon dioxide is injected into cavity resonator 12 at approximately atmospheric pressure from cylinder 100.

The carbon dioxide laser device 10 emits a $TM_0$ mode wave that is filtered by oppositely disposed conical interfaces 25 and 27 which limit transparent block 26, located in cavity resonator 12. Faces 26 and 27 of block 25 are inclined at the Brewster angle relative to the rays of device 10 that propagate parallel to the longitudinal axis of device 10, that is the angle of incidence of the parallel rays is such that the tangent of the angle of faces 26 and 27 relative to the axis is equal to the refraction index of the transparent block 25. For 10 $\mu$m waves emitted by the carbon dioxide laser, the transparent substances mostly used for block 25 are zinc sulphide or selenide.

The thickness of block 25 is great enough to converge the rays of device 10 closer to the beam axis. Between mirror 13 and interface 26, the electric field of the wave has a pattern very similar to that of the coaxial fundamental mode, at least in its center portion. Between interface 27 and window 14, the propagation mode is very similar to that of the $TM_0$ mode in a circular waveguide. The field decrease at the periphery of the beam depends on the exact shape of mirrors 13 and 14. In the above, we have assumed that the mirrors 13 and 14 are flat, but to have good beam stability, it is best for the meridian line of these mirrors to have a slight curvature, so that the curvature center of one meridian line is on the other, as known in the prior art. Under such conditions, the propagation is in a Laguerro-Gaussian mode, that is a mode in which the amplitude of the electric field related to the distance to the axis is represented by a Gaussian function multiplied by a Laguerre's polynomial. In practice in the present case, the radial electric field $E_\rho$ may be represented, at a point at a distance $\rho$ from the axis, by a function having the form:

$$E_\rho = E_0 \frac{\rho}{\sigma} \exp \frac{1}{2}\left(1 - \frac{\rho^2}{\sigma^2}\right), \quad (1)$$

with $E_0$ and $\sigma$ being respectively a reference electric field and a reference length selected to that $E_0 \rho$ is maximum and equal to $E_0$ when $\rho$ is equal to $\sigma$.

The cross sections of the beams are large enough for the axial component of the electric field to be considered as negligible.

As the rays emerge from window 14, they are incident on a tank 15 filled with a liquid having a rotary power, as described supra. Tank 15 is surrounded by a coil 16. The rotary power may be a natural rotary power in which case the length of the tank is determined so that the polarization angle is $\pi/2$ radians. If the rotary power is an induced rotary power, the current in the magnetic field coil is set to obtain the same value of $\pi/2$ for the polarization rotation angle. Thus, the $TM_0$ mode electric field direction rotates by $\pi/2$, that is the $TM_0$ mode is converted into the $TE_0$ mode as the beam propagates through tank 15. The rays with such a propagation mode are focused by the parabolic mirror 17 onto material 18 which is to be converted into an extremely hot plasma. Material 18 is preferably deuterium in crystal form, because crystalline deuterium is the most easily fused material; other suitable examples of material 18 are boron or lithium hydrides, or double hydrides called boranes. Material 18 is placed on the pole of radially polarized permanent magnet 19. Material 18 and magnet 19 form a structure which is rotated about axle 20 to renew the fusible material subjected to the impact of the laser beam.

The applicant has already disclosed in U.S. patent application, Ser. No. 007,574 filed Jan. 29, 1979, an X-ray laser comprising a $TM_0$ mode filter and a Faraday effect tank traversed by a $TM_0$ mode wave beam. In the Ser. No. 7,574 patent application, the tank containing a liquid with rotatory power does not act as a mode converter but only functions as a pulse producing circuit. The tank in the prior applications lowers the Q factor of the cavity resonator of the laser for the $TM_0$ mode.

Figure 2:
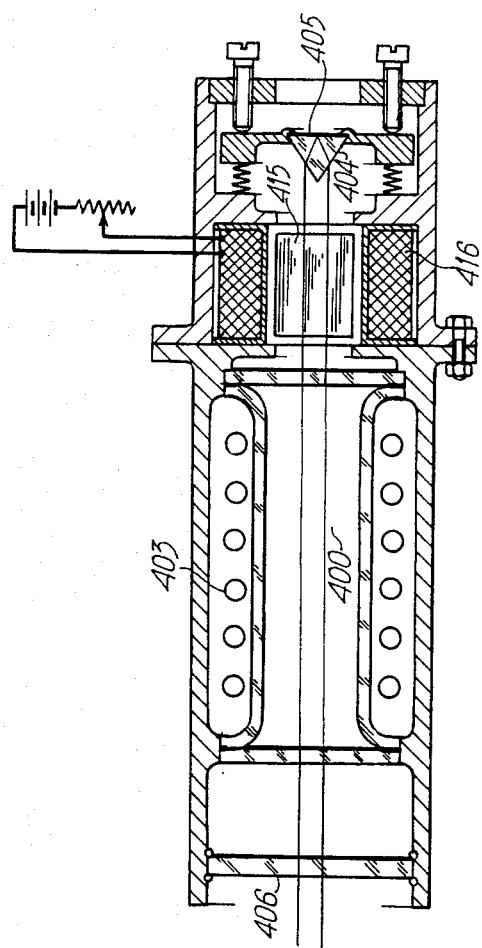
FIG. 2 is a cross sectional diagram of a second embodiment of a gas laser in which the $TM_O$ mode selector and the $TM_0$–$TE_0$ mode converter do not have the same relative position as in FIG. 1.

FIG. 2 is a diagram of another embodiment of the laser device of FIG. 1 in which the order or sequence of the laser cavity resonator, the $TM_0$ mode filter and the $TM_0$–$TE_0$ is changed so the order is: laser cavity resonator, $TM_0$–$TE_0$ converter and $TM_0$ mode filter, i.e. the mode filter is downstream of the mode converter.

The $TM_0$ mode filter is a Brewster's cone 404. The $TM_0$–$TE_0$ converter including Faraday effect tank 415 and coil 416 are identical with tank 15 and core 16 which perform the same function in FIG. 1. Gas in cavity resonator 400 of the gas laser is surrounded by and excited by flood lamp 403; the ends of the resonator 400 are limited by reflecting mirror 405 and semi-reflecting mirror 406.

Figure 3A:
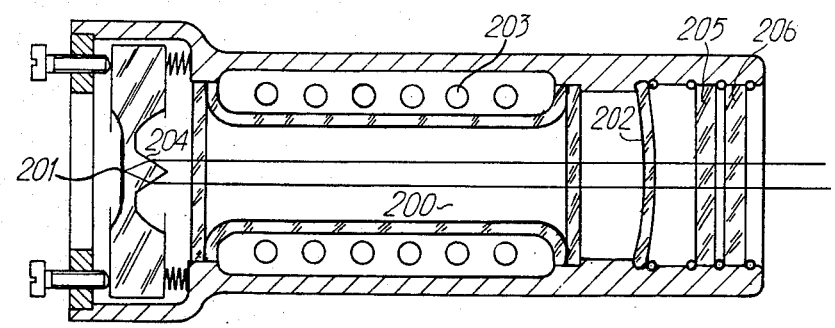
FIGS. 3A and 3B are cross sectional views of two embodiments of gas lasers in which the $TM_0$ mode is selected by a mode filter and in which the laser beam traverses two crossed half-wave plates which convert the $TM_0$ mode into the $TE_0$ mode.
Figure 3B:
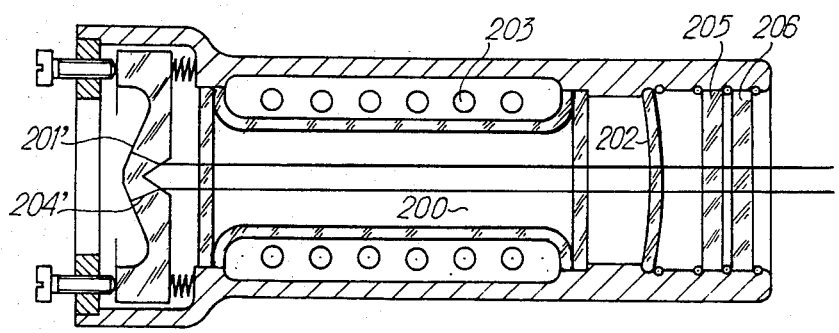

FIGS. 3A and 3B are cross sectional views of lasers emitting a $TM_0$ mode wave followed by a $TM_0$-$TE_0$ converter. In FIG. 3A, the laser cavity resonator 200 is filled with gas. Resonator 200 is bounded at opposite ends by reflecting mirror 21 and semi-reflecting mirror 202. The active gas is pumped by flood lamp 203. The $TM_0$ wave is filtered by conical diopter 204 shaped in a transparent plate. The face of the transparent plate opposite diopter 204 carries mirror 201. The $TM_0$-$TE_0$ converter is formed by two half-wave birefringent plates 205 and 206 oriented so that the fast and slow axes of the first plate bisect the angles formed by the fast and slow axes of the second plate. It is well known that such a combination of half-wave plates rotates the polarization of the $TM_0$ mode wave by $\pi/2$ radians to obtain a $TE_0$ mode wave.

The mode filter including diopter 204 and mirror 201 of FIG. 3A cannot be used for high powers as the on axis concentration of the energy produced by diopter 204 would break the filter.

Figure 4:
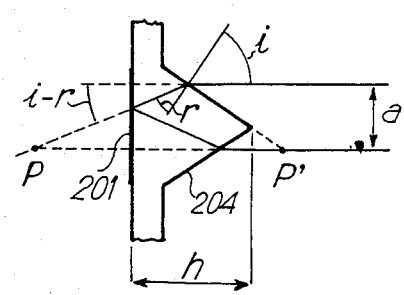
FIG. 4 is an explanatory schematic diagram.

FIG. 4 represents details of the Brewster's cone. A ray incident on the cone having an angular half aperture of $(\pi/2 - i)$ and propagating parallel to the axis is refracted as it passes through the conical diopter so its propagation direction through the cone is $(i - r)$, such that:

$$\tan(i - r) = \frac{1}{2}\left(n - \frac{1}{n}\right) \quad (1)$$

where n=index of refraction of the cone.

The ray, after being reflected on mirror 201 that is perpendicular to the axis, emerges from the cone parallel to the axis at a distance a from the incident ray. If h is the distance from the tip of the conical diopter to the mirror plane, we have, considering that $i+r=\pi/2$:

$$2h = \frac{a}{\tan(i-r)} + \frac{a}{\tan r} = a n \frac{n+1}{n^2-1} \quad (2)$$

The ray entering the cone between radii R and (R+dR) emerges from the cone between the radii (a−R) and (a−R−dR). Designating the electric field by E, the conservation of energy gives:

$$2\pi E^2(R) \times R dR = 2\pi E^2(a-R) \times (a-R) dR \quad (3)$$

which indicates that $RE^2(R)$ must be a symmetrical function of R and (a−R). In addition, near the axis, E must increase proportionally to R. The most simple function meeting this definition is $R^3 (a-R)^3$. With this definition, E takes the form:

$$E = E_0 \frac{R}{a}\left(1 - \frac{R}{a}\right)^{3/2} \quad (4)$$

Due to the Brewster's law, the wave which twice crosses cone 204 by reflecting on mirror 201, is in $TM_0$ mode. Its axial component is negligible as radius a of the beam is wide relative to the wavelength.

To avoid the accumulation of energy on the axis in FIG. 3B, conical diopter 204 of FIG. 3A is replaced by a recessed conical diopter 204'. Mirror 201 is conical mirror 201' which propagates the rays back along the same path from which they are incident from the diopters. In addition, the other items of FIG. 3B are designated by the same reference numerals as in FIG. 3A; as seen in FIG. 3B, the half angle aperture of conical mirror 201' is $$\left(\frac{\pi}{4} + r - i\right) = \frac{\pi}{2} - 2i \text{ since } i + r = \frac{\pi}{4}$$

The two half-wave plates 205 and 206 are such that the fast and slow axes of one plate are the bisector of the fast and slow axes of the other plate. If two cascaded half-wave plates have the fast and slow axes of the first plate subtending an angle $\gamma$ with the fast and slow axes of the second plate, the electric field vector is subjected to two successive symmetries relative to two axes having an angle $\gamma$ between them: the electric field vector therefore rotates by $2\gamma$. If $\gamma = \pi/4$, the electric field rotates by $\pi/2$, which transforms the $TM_0$ mode into the $TE_0$ mode.

The mode converter of FIGS. 3A and 4B is especially suited to visible light and infrared waves for which birefringent materials are available.

Figure 5:
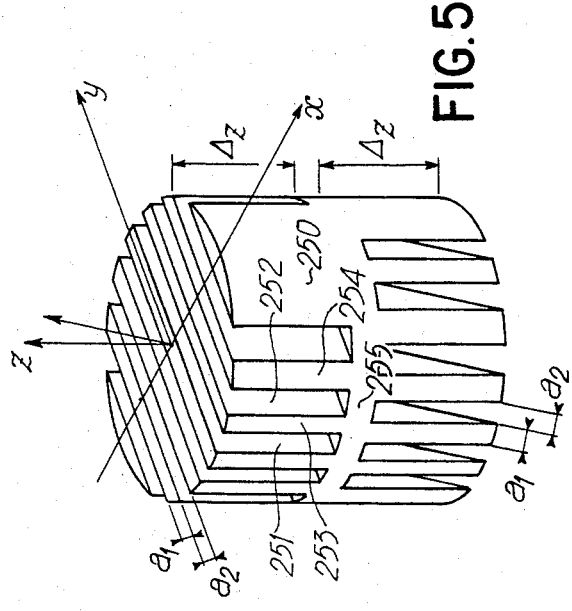
FIGS. 5 and 6 are illustrations of devices for extending to the centimetric wave range the mode converter of FIGS. 3A and 3B.

In the case of centimeter waves for which there are no known naturally anisotropic materials, the material is made anisotropic artificially by using the structure of FIG. 5.

In FIG. 5, transparent cylindrical block 250 is cut with multiple parallel sided slots 251 and 252 at right angles to the Z or longitudinal axis of the cylinder. Between slots 251 and 252 are laminations 253 and 254. The thickness of the laminations is $a_1$ and the width of slots is $a_2$ while the permitivities of the lamination and slots are respectively $\epsilon_1$ and $\epsilon_2$. If the sum of $a_1$ and $a_2$ is much smaller than the wavelength of the incident centimeter waves, the laminated block acts on the waves as a homogeneous anisotropic material of which the apparent dielectric constant can be calculated. For waves with a polarization parallel to the faces of the parallel sided laminations, the mean dielectric constant $\epsilon \|$ of the block 250 is given by:

$$\epsilon \| = \frac{a_1 + a_2}{\frac{a_1}{\epsilon_1} + \frac{a_2}{\epsilon_2}} \quad (5)$$

and for waves with a polarization perpendicular to the faces of the laminations:

$$\epsilon_\perp = \frac{a_1 \epsilon_1 + a_2 \epsilon_2}{a_1 + a_2} \quad (6)$$

These formulas are given in works on multilayers; see for example "Waves in Layered Media" by Leonid M. Brekhovskikh, Academic Press, 1960, page 83, formula 7.13 and page 84, formula 7.20.

To make the laminated block of FIG. 5 a half-wave plate, the slots must have a depth of $\Delta z$ so that:

$$\Delta z(\sqrt{\epsilon_{\parallel}} - \sqrt{\epsilon_{\perp}}) = \lambda/2 \qquad (7)$$

The ratio $a_1/a_2$ must maximize the factor $(\sqrt{\epsilon_{\parallel}} - \sqrt{\epsilon_{\perp}})$ to have a maximum effect with minimum size and for a slight variation of the ratio $a_1/a_2$ related to a manufacturing defect that does not disturb the system.

To calculate the optimum ratio, we use parameter $\beta$ so that:

$$\beta = \frac{a_1 - a_2}{a_1 + a_2} \times \frac{\epsilon_1 - \epsilon_2}{\epsilon_1 + \epsilon_2} \qquad (8)$$

Formulas (5) and (6) are rewritten as a function of parameter $\beta$ as:

$$\epsilon_{\perp} = \frac{\epsilon_1 + \epsilon_2}{2}(1 + \beta) \qquad (9)$$

$$\epsilon_{\parallel} = \frac{2\epsilon_1\epsilon_2}{(\epsilon_1 + \epsilon_2)(1 - \beta)} \qquad (10)$$

By setting the derivative $d/d\beta(\sqrt{\epsilon_{\parallel}} - \sqrt{\epsilon_{\perp}})$ to zero, one obtains $$\frac{(1-\beta)^3}{1+\beta} = \frac{4\epsilon_1\epsilon_2}{(\epsilon_1 + \epsilon_2)^2} \qquad (11)$$

By assuming $\beta$ to be very small, we can replace the first member by the first term of a series expansion of $\beta$:

$$\beta = \frac{1}{4}\left[\frac{\epsilon_1 - \epsilon_2}{\epsilon_1 + \epsilon_2}\right]^2 \qquad (12)$$

By substituting Equation (8) into Equation (12):

$$\frac{a_1 - a_2}{a_1 + a_2} = \frac{1}{4}\frac{\epsilon_1 - \epsilon_2}{\epsilon_1 + \epsilon_2} \qquad (13)$$

As an example of block 250, consider that polystyrene plates are separated by air, for which $\epsilon_1 = 2.56$ and $\epsilon_2 = 1$ we have:

$$\frac{a_1 - a_2}{a_1 + a_2} = 0.11 \quad \frac{a_1}{a_1 + a_2} = 0.55 \text{ and } \frac{a_2}{a_1 + a_2} = 0.44 \qquad (14)$$

By considering formula (7), the thickness $\Delta z$ of the half-wave plates, that is the dimension of the device along the propagation axis, is given by:

$$\Delta z = \frac{\lambda}{2(\sqrt{\epsilon_{\parallel}} - \sqrt{\epsilon_{\perp}})} = \frac{\lambda}{0.76} \qquad (15)$$

we can demonstrate that:

$$(\sqrt{\epsilon_{\parallel}} - \sqrt{\epsilon_{\perp}})_{maxi} = 2\beta\sqrt{\frac{\epsilon_1 + \epsilon_2}{2}} = \frac{(\epsilon_1 - \epsilon_2)^2}{2^{3/2}(\epsilon_1 + \epsilon_2)^{3/2}} \qquad (16)$$

Block 250 in FIG. 5 comprises two laminated parts with an angle of 45° between them. Block 250 may be built up by making parallel kerfs near one another on both sides of a dielectric material block. These kerfs have a depth to form a solid portion 255 at the center of the block.

Figure 6:
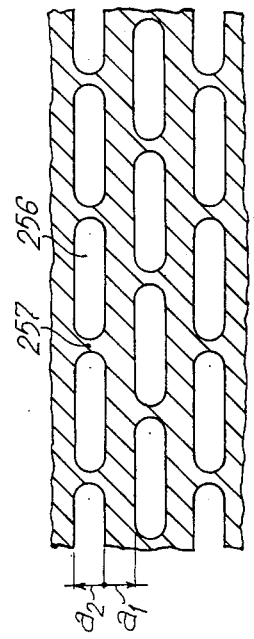

Still within the invention, the laminations can be separated by dielectric stubs that form spacers to maintain a constant spacing between the laminations. The cross section of the dielectric block in a plane parallel to plane xOy has an appearance as indicated in FIG. 6. The piece presents a series of elongated holes 256 separated by strips 257. For ease of drawing off the material, the holes may be slightly larger at the top than at the bottom of the block.

Figure 7:
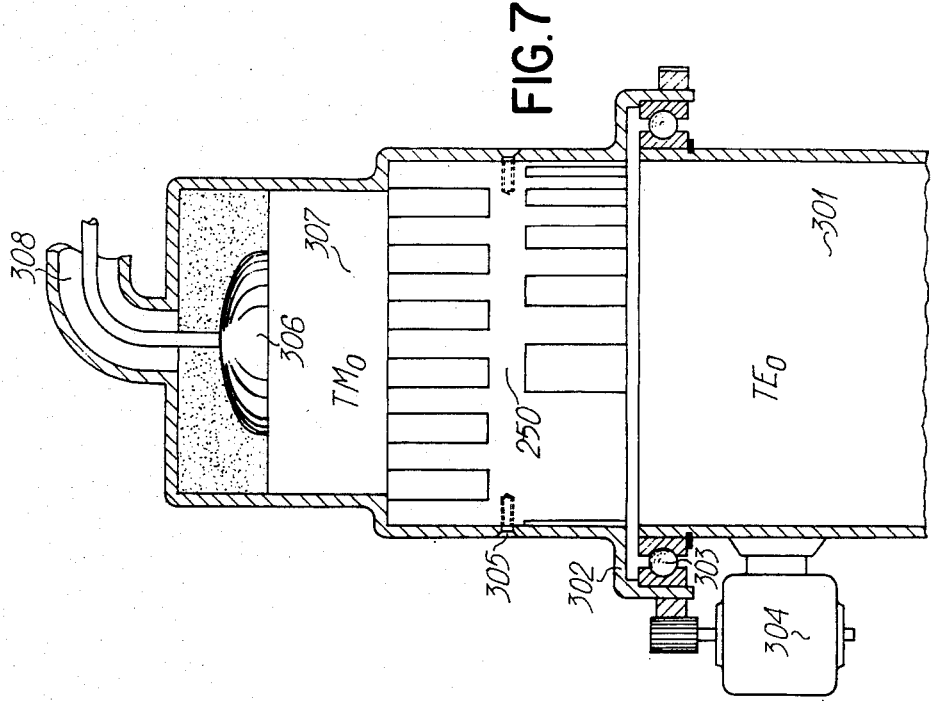
FIG. 7 is a side view of a swivel joint converter employing the converter of FIG. 5.

The mode converter of FIG. 5 can be used as a swivel joint antenna feeder, as illustrated in FIG. 7. The apparatus of FIG. 7 employs the FIG. 7 converter as part thereof. The feeder of FIG. 7 comprises a waveguide 301 in which the centimeter waves travel in the $TE_O$ mode. Wave guide 301 is connected to swivel joint 302 by ball bearing 303. Joint 302 is driven by motor 304 fixedly mounted on wave guide 301. Joint 302 carries $TE_{01}$—$TM_{01}$ mode converter 250 (per FIG. 5) which is secured in a metal envelope of the joint by polythene screws 305. Centimeter wave guide coaxial transition 306 between guide 307 and coaxial cable 308 responds to centimeter wave energy propagated through block 250 to feed an antenna, not shown.

The above and still further objects, features and advantages of the present invention will become apparent upon consideration of the following detailed description of several specific embodiments thereof, especially when taken in conjunction with the accompanying drawings.

What is claimed is:

1. An electromagnetic cavity resonator for sustaining $TM_O$ and $TE_O$ mode wave components, said cavity resonator being adapted for substantially increasing the $TE_O$ mode components, decreasing the $TM_O$ mode components and projecting plasma confining $TE_O$ mode components on to a plasmatized material, said electromagnetic cavity resonator comprising:

a first electromagnetic wave semi-reflecting reflector forming a first outer boundary of said cavity resonator;

a second electromagnetic wave reflector forming a second outer boundary of said cavity resonator and facing the first reflector, said second reflector being an outer surface of a transparent material having an index of refraction n;

said transparent material including a conical member of revolution having an axial location integral with the second reflector on the side of the second reflector facing the first reflector, said conical member having an angular half aperture i equal to the complement of the Brewster's angle to $\pi2$, so that $\tan(\pi/2 - 1) = 1/n$, whereby said second reflector and member act simultaneously as a boundary of the cavity resonator and as a filter for removing $TM_O$ mode components;

an active lasing medium located between the first and second reflectors so that $TM_O$ mode components, at a given wavelength, propagate through the second reflector;

a $TM_O$—$TM_m$ mode coverter means for rotating the polarization direction of the $TM_O$ mode components propagating through the second reflector by an angle of $\pi/2$ to derive $TE_O$ mode components; and means for focusing said TE$_O$ mode components on to a material to be plasmatized.

2. An electromagnetic cavity resonator according to claim 1, wherein the conical member of revolution is an extension of said transparent material and the second electromagnetic wave reflector is a plane mirror.

3. An electromagnetic cavity resonator according to claim 1, wherein the conical member of revolution is formed by a hollow in said transparent material and the second electromagnetic wave reflector is a conical mirror having a half apex angle of 180°−2i where i is the Brewster's angle of the reflector.

4. An electromagnetic cavity resonator for sustaining TM$_O$ and TE$_O$ mode wave components of a given wavelength, said cavity resonator being adapted for substantially increasing the TE$_O$ mode components, decreasing the TM$_O$ mode components and projecting plasma confining TE$_O$ mode components on to a plasmatized material, said electromagnetic cavity resonator comprising:

a first electromagnetic wave semi-reflecting reflector forming a first outer boundary of said cavity resonator;

a second electromagnetic wave reflector forming a second outer boundary of said cavity resonator and facing the first reflector, said second reflector being the outer surface of a transparent material having an index of refraction n;

said transparent material including a conical member of revolution having an axial location integral with the second reflector on the side of the second reflector facing the first reflector, said conical member having an angular half aperture i equal to the complement of the Brewster's angle to $\pi/2$, so that tan $(\pi/2-1)=1/n$, whereby said reflector and member act simultaneously as a boundary of the cavity resonator and as a filter for removing TM$_O$ mode components;

an active lasing medium located between the first and second reflectors so that TM$_O$ mode components, at a given wavelength, propagate through the second reflector;

a TM$_O$–TE$_O$ mode converter means for rotating the polarization direction of the TM$_O$ mode components propagating through the second reflector by an angle of $\pi/2$ to derive TE$_O$ mode components, the mode converter including an elongated dielectric block having a substantially cylindrical shape and formed of a first transparent material, a plurality of slots arranged parallel to each other being formed in each end of the block such that, at each end of the block, laminations of the first transparent material are separated by laminations of a second transparent material, the ends being connected by a solid central portion of the first transparent material, the planes of the laminations at one end of the block making an angle of 45° with the laminations at the other end and the depth of the laminations in the direction of the cylinder axis being equal to the half of said wavelength; and means for focusing said TE$_O$ mode components onto a material to be plasmatized.

5. A source of TE$_O$ optical waves comprising a cavity wave resonator;

the cavity wave resonator including:

a first electromagnetic wave semi-reflecting reflector forming a first outer boundary of said cavity resonator;

a second electromagnetic wave reflector forming a second outer boundary of said cavity resonator and facing the first reflector;

an active lasing medium located between the first and second reflectors so that TM$_O$ mode components at a given wavelength propagate through the second reflector, a TM$_O$–TE$_O$ mode converter means for rotating the polarization direction of the TM$_O$ mode components propagating through the second reflector by an angle of $\pi/2$ to derive TE$_O$ mode components, the mode converter including an elongated dielectric block having a substantially cylindrical shape and formed of a first transparent material, a plurality of slots arranged parallel to each other being formed in each end of the block such that, at each end of the block, laminations of the first transparent material are separated by laminations of a second transparent material, the ends being connected by a solid central portion of the first transparent material, the planes of the laminations at one end of the block making an angle of 45° with the laminations in the direction of the cylinder axis being equal to the half of said wavelength.

* * * * *